US007664601B2

(12) United States Patent
Daly, Jr.

(10) Patent No.: US 7,664,601 B2
(45) Date of Patent: Feb. 16, 2010

(54) WEATHER INCIDENT PREDICTION

(75) Inventor: Francis W. Daly, Jr., Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 1003 days.

(21) Appl. No.: 10/823,951

(22) Filed: Apr. 13, 2004

(65) Prior Publication Data

US 2004/0239550 A1  Dec. 2, 2004

Related U.S. Application Data

(63) Continuation-in-part of application No. 09/676,457, filed on Sep. 29, 2000, now abandoned.

(60) Provisional application No. 60/164,638, filed on Nov. 10, 1999.

(51) Int. Cl.
G01W 1/00  (2006.01)

(52) U.S. Cl. .......................... 702/3; 342/26 B (58) Field of Classification Search ............ 702/3; 342/26 R, 26 B
See application file for complete search history.

(56) References Cited

U.S. PATENT DOCUMENTS

| 4,760,530 | A |   | 7/1988  | Liden |
| 4,774,670 | A |   | 9/1988  | Palmieri |
| 4,811,230 | A |   | 3/1989  | Graham et al. |
| 4,940,987 | A |   | 7/1990  | Frederick |
| 5,051,910 | A |   | 9/1991  | Liden |
| 5,077,558 | A |   | 12/1991 | Kuntman |
| 5,198,819 | A |   | 3/1993  | Susnjara |
| 5,262,782 | A |   | 11/1993 | Rubin et al. |
| 5,392,048 | A |   | 2/1995  | Michie |
| 5,615,118 | A |   | 3/1997  | Frank |
| 5,717,589 | A |   | 2/1998  | Thompson et al. |
| 5,739,770 | A |   | 4/1998  | Liden |
| 5,959,567 | A |   | 9/1999  | Wolfson et al. |
| 5,974,360 | A | * | 10/1999 | Otsuka et al. ............ 702/3 |
| 6,199,008 | B1 |  | 3/2001  | Aratow et al. |
| 6,219,594 | B1 |  | 4/2001  | Nicosia et al. |

* cited by examiner

*Primary Examiner*—Jeffrey R West
(74) *Attorney, Agent, or Firm*—Black Lowe & Graham PLLC (57) ABSTRACT

A method for short-term prediction of storm cells in aircraft using a modified weather radar system, and a modified weather radar system embodying the method. The storm cell prediction method including the operations of accessing first and second weather radar images generated relative to the aircraft and having a similar relationships to the aircraft; mapping the first weather radar image onto the second weather radar image; comparing the first and second weather radar images; forecasting information describing a weather condition represented by the first and second weather radar images; retrieving a phase of flight of the aircraft; and generating a warning as a function of the forecast information describing a weather condition and the aircraft phase of flight.

1 Claim, 7 Drawing Sheets

WEATHER INCIDENT PREDICTION

This application is a Continuation-in-part and claims benefit of application Ser. No. 09/676,457 filed on Sep. 29, 2000, now abandoned which claims the benefit of U.S. Provisional Application Ser. No. 60/164,638, filed in the name of Francis W. Daly, Jr. on Nov. 10, 1999, the complete disclosure of which is incorporated herein by reference.

FIELD OF THE INVENTION

This application relates to weather prediction, and in particular relates to short term prediction of storm cells in aircraft using a modified weather radar system, and further relates to predicting a coincidence of the flight path of the host aircraft with a predicted storm cell and alerting the aircraft crew under predetermined conditions.

BACKGROUND OF THE INVENTION

Various brands and configurations of weather radar systems are resident on commercial aircraft. These airborne weather radar systems currently supply real-time information about the position and intensity of weather conditions ahead of the aircraft generally along its current flight path. Assessing the weather condition requires both reflectivity information, which relates to rate of precipitation due to the weather condition, and height information, which describes the vertical extent of the weather condition. Typically, the radar antenna mounted on the nose of the aircraft scans through an azimuth angle, sweeping horizontally from side-to-side at a selected elevation, or vertical tilt, to detect weather conditions in an arc centered on the aircraft's flight path. The information about the position and intensity of weather conditions is displayed to the crew on a radar screen mounted in the cockpit.

Conventional weather radar systems provide a single elevation, i.e., vertical, plan view on the display screen. The plan view is a view looking down, with the radar antenna scanning through an azimuth angle at a particular elevation angle, the up-down tilt of the radar antenna. The tilt or elevation angle is manually controlled using a "tilt control." The elevation angle or tilt of the display is adjusted to obtain an impression of the height of the various weather conditions and their physical relationship to the host aircraft. Use of conventional radar systems requires substantial training and experience to accurately analyze a potential weather threat based on this information. In airborne radar, user workload is an important consideration. Workload considerations are magnified during approach and landing under adverse weather conditions. U.S. Pat. No. 5,392,048 entitled, Weather Radar System Including An Automatic Step Scan Mode, issued to Michie on Feb. 21, 1995, the complete disclosure of which is incorporated herein by reference, discloses a weather radar system which is operable in an automatic mode that positions the antenna beam to scan an elevation axis in incremental steps between upper and lower scan limits while continuously scanning an azimuth axis.

Another weather radar system scans the radar antenna in a vertical, or elevation, mode to display on the radar screen a vertical side view at a given radial angle. Height versus range information at a selected azimuth angle is thereby readily available. The antenna is incrementally stepped through the limits of the azimuth angle. This design also requires skill and constant attention to assess weather conditions at all azimuth angles.

Still another weather radar system disclosed by U.S. Pat. No. 4,940,987, entitled Automatic Horizontal And Vertical Scanning Radar, issued to Frederick on Jul. 10, 1990, the complete disclosure of which is incorporated herein by reference, simultaneously displays two views of a weather condition: a conventional plan view, and a vertical side or frontal view. The net effect is a view of the weather condition in two intersecting planes. One plane is a horizontal plan view, while the other plane is user selected as either a vertical slice along the radar range axis, or a vertical slice perpendicular to the range axis. The display update rate for this weather radar system is slow because the antenna beam must be positioned to cover a full volume of space, and the system requires substantial computer storage or memory capacity to support the large amount of information needed. Workload is high because of the requirement to select range or radial angle for the vertical slices or views. Also the data is included in two intersecting planes and must be visually integrated and interpreted to be of value.

U.S. Pat. No. 5,198,819, entitled Weather Radar Display System, issued to Susnjara on Mar. 30, 1993, the complete disclosure of which is incorporated herein by reference, discloses a weather radar system that stores multiple plan views in separate display memories. The views are displayed in overlapping fashion on the screen, with only the highest of the stored views shown in true weather condition precipitation intensities. The storage of multiple plan views to fill multiple memory planes suffers a long lag time. Each horizontal scan usually takes several seconds to complete. Therefore, even if the currently scanned view is continuously updated, the displayed complete view includes data that may lag by almost a minute. This problem is especially significant during and immediately after changes in aircraft heading. Also, implementation of the disclosed weather radar system is difficult due to the complexity of the display unit required to show the overlapping plan views.

Although the path that weather conditions, or "storm cells," take has not been highly predictable over very long periods, given the position and intensity history of a weather condition, short-term predictions of future location and intensity can be made effectively. Several incidents have occurred in which an aircraft encountered severe weather condition during a critical phase of flight, resulting in a serious threat to the safety of the aircraft, its crew and passengers.

Weather Tracking

Systems and methods providing for real-time weather tracking and storm movement prediction on a regional or global scale are well known. For example, U.S. Pat. No. 5,717,589, entitled System And Method Providing For Real-time Weather Tracking And Storm Movement Prediction, issued to Thompson et al on Feb. 10, 1998, the complete disclosure of which is incorporated herein by reference, discloses a real-time weather tracking system and method for tracking and predicting future movements of significant weather by integrating real-time weather data collected from many different sources, communicating the integrated data to remote users, and computing, predicting, and displaying the expected movements of significant weather. U.S. Pat. No. 5,717,589 also discloses a system and method for combining the integrated data with geographical information and displaying the combined real-time weather data and geographical information.

Cross-correlation methods are widely used in conventional real-time weather tracking and prediction systems employing weather radar images. For example, a publication by Yoshio Asuma, Katsuhiro Kikuchi, and Hisashi Kon, entitled *A Method for Estimating the Advection Velocity of Radar Echoes Using a Simple Weather Radar System*, Geophysical Bulletin of Hokkaido University, Vol. 44, October, 1984, pages 23-34, and another publication by Yoshio Asuma, Katsuhiro Kikuchi, and Hisashi Kon, entitled *Experiments for a Very-Short-Range Prediction of Snowfall Using a Simple Weather Radar System*, Geophysical Bulletin of Hokkaido University, Vol. 44, October, 1984, pages 35-51, the complete disclosures of which are incorporated herein by reference, each describe cross-correlation methods of weather tracking and prediction. Briefly, cross-correlation uses two weather radar images separated by an arbitrary time interval DELTA T. During shifting of one of the images, respective correlation values of the image gray levels are calculated. The amount of movement of the precipitation field between the two frames is the shift having the greatest correlation value. Using the calculated amount of movement, a parallel translation is performed on the precipitation field within the most current weather radar image. The resulting image is the forecast image.

Figure 1A:
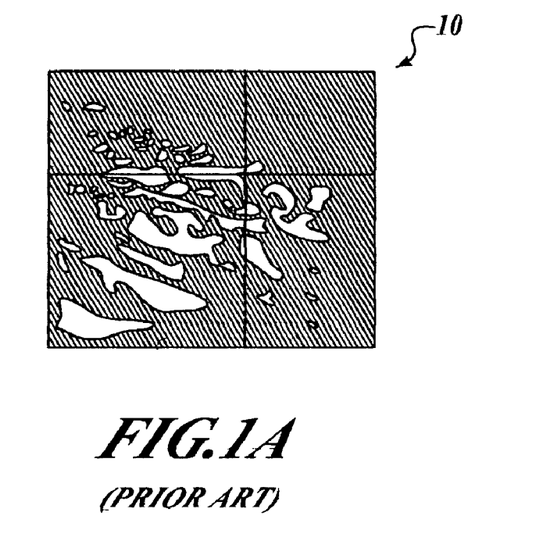
FIGS. 1A and 1B illustrate that a radar echo within a weather radar image has both large and small echo cells as its fundamental elements, the echo cells forming a precipitation field when combined to form a group.
Figure 1B:
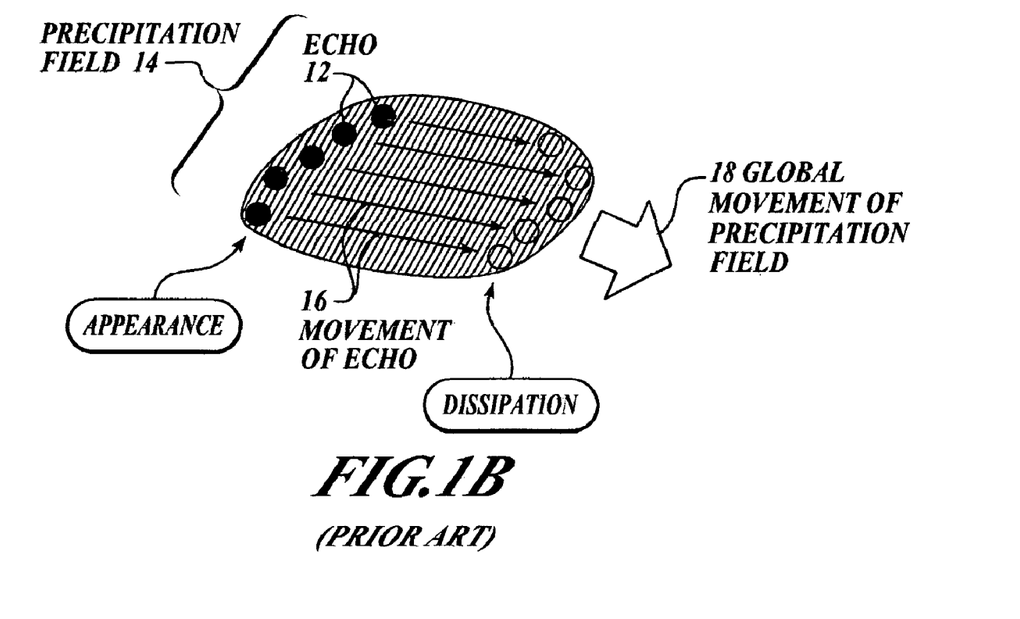

FIGS. 1A and 1B illustrate that the radar echo within the weather radar image 10 has both large and small echo cells 12 as its fundamental elements, as described in U.S. Pat. No. 5,974,360 by Otsuka et al. One precipitation field 14 is formed when these echo cells 12 combine to form a group. Hereinafter, echo cells 12 are referred to simply as "echoes." In a weather radar image 10, a precipitation field 14 possessing multiple different dynamics may exist. According to the cross-correlation methods of weather tracking and prediction the constant repetition of deformation and appearance and dissipation of echoes 12 in a weather condition is generalized as a precipitation field 14 moving along with the flow of the atmosphere. Conventional cross-correlation methods do not distinguish between the moving velocity of the individual echoes 12 indicated by respective arrows 16 and the moving velocity of the precipitation field 14 as a whole. Rather, the method calculates one or more global movement vectors 18 based on the correlation value of the gray level of a large portion of the precipitation field 14 from the radar images of the two frames.

Figure 2:
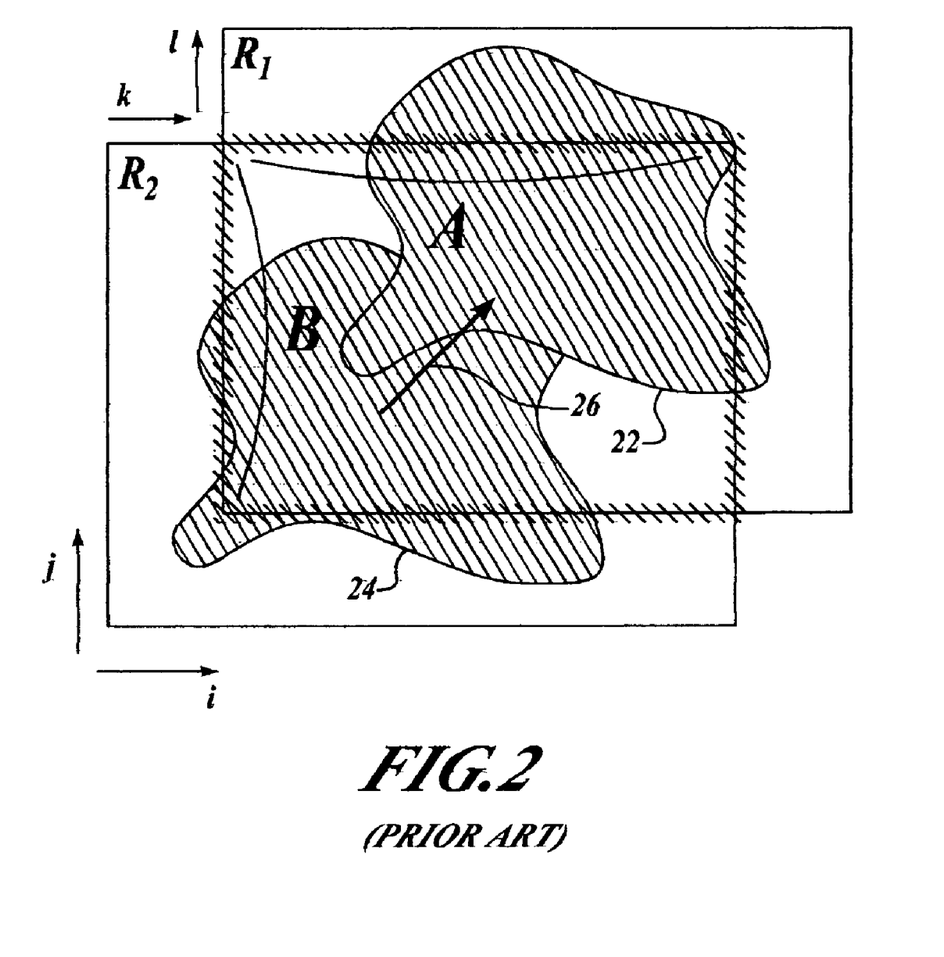
FIG. 2 illustrates the cross-correlation method of forecasting the movement of a precipitation field.

FIG. 2 illustrates the method of obtaining the cross-correlation coefficient from the two weather radar images R1, R2, which are measured at two different times separated by a time interval DELTA T. In FIG. 2, the gray levels of the image or the lattice point (ij) in the radar images are assigned as R1(ij) and R2(ij), respectively, for the two measured images R1, R2. The fields to be correlated are A and B, respectively. The shift of the two radar images when calculating the correlation value is assigned as (k, l). In FIG. 2, the oblique lines 22, 24 indicate the field to be correlated, while the arrow 26 in the center indicates the direction of the movement of the echo pattern. The cross-correlation coefficient SIGMA $\sigma_{k,l}$ is obtained from the two weather radar images R1, R2, according to:

$$\sigma_{k,l} = \frac{\sum_{i=1}^{A}\sum_{j=1}^{B} R_1(i,j) R_2(i+k, j+l) - AB\overline{R}_1\overline{R}_2}{\sqrt{\left(\sum_{i=1}^{A}\sum_{j=1}^{B} R_1(i,j)^2 - AB\overline{R}_1^2\right)\left(\sum_{i=1}^{A}\sum_{j=1}^{B} R_2(i,j)^2 - AB\overline{R}_2^2\right)}} \quad \text{(Eq. 1)}$$

$$\text{where: } \overline{R}_1 = \frac{\sum_{i=1}^{A}\sum_{j=1}^{B} R_1(i,j)}{AB}; \text{ and} \quad \text{(Eq. 2)}$$

$$\text{where: } \overline{R}_2 = \frac{\sum_{i=1}^{A}\sum_{j=1}^{B} R_2(i+k, j+l)}{AB}. \quad \text{(Eq. 3)}$$

Figure 3:
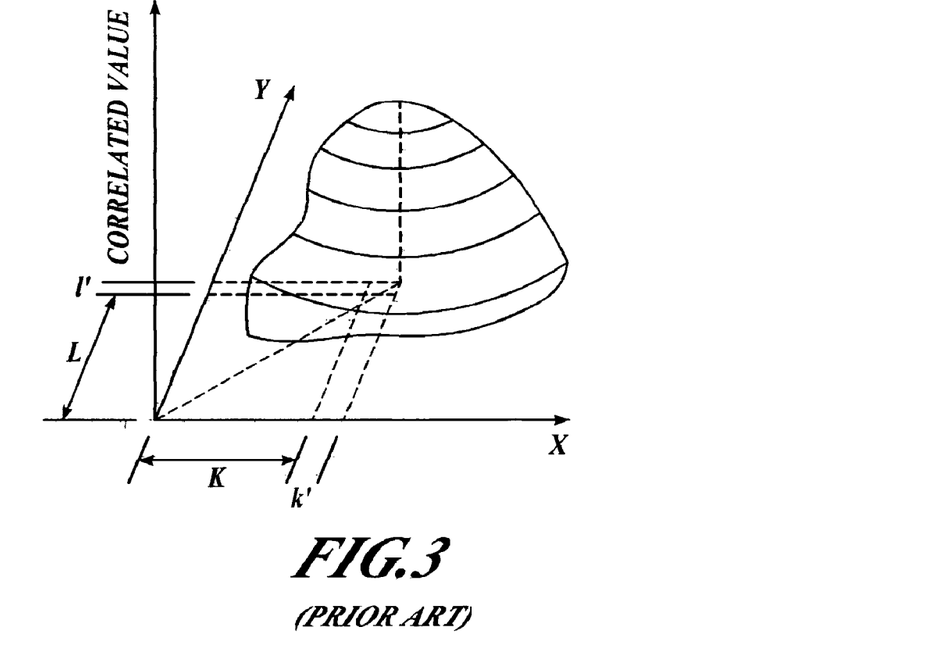
FIG. 3 is an exemplary illustration of one possible value of a cross-correlation coefficient obtained through calculation using the cross-correlation method.

FIG. 3 is an exemplary illustration of one possible value of a cross-correlation coefficient $\sigma_{k,l}$ obtained through calculation using the above equations.

Figure 4:
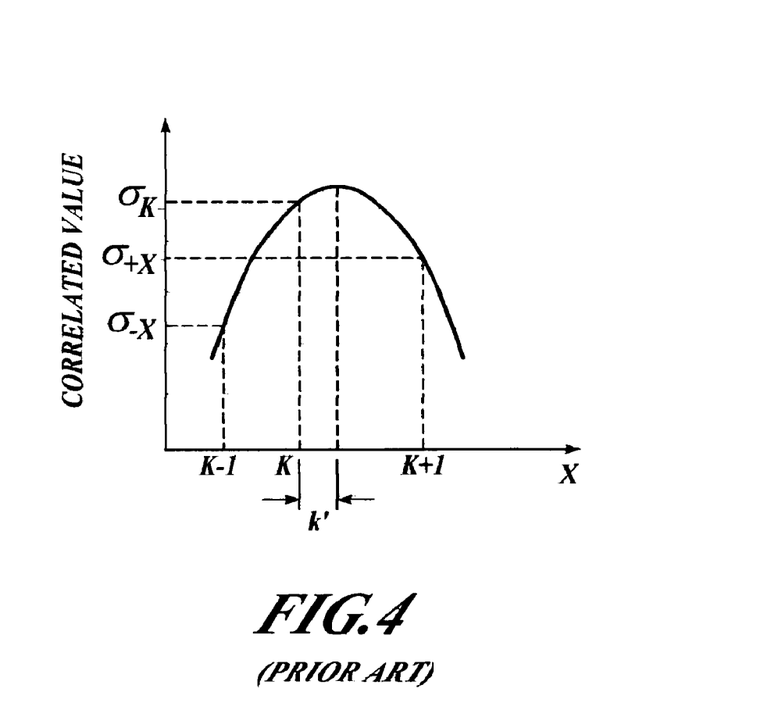
FIG. 4 illustrates an interpolation based on a second order function performed on the cross-correlation coefficient at a point where the greatest cross-correlation value exists, and the four cross-correlation values in its vicinity, and also illustrates one component of the shift between the lattice point where the greatest cross-correlation value exists and the point where the cross-correlation value resulting from the compensation is greatest.

FIG. 4 illustrates an interpolation based on a second order function performed on the cross-correlation $\sigma_{K,L}$ at point (K,L) of the lattice point where the greatest cross-correlation value exists, and the four cross-correlation values in its vicinity: $\sigma_{-x}$, $\sigma_{+x}$, $\sigma_{-y}$, and $\sigma_{+y}$. FIG. 4 also illustrates the X component of the shift $(k^1, l^1)$ between the lattice point where the greatest cross-correlation value exists and the point where the cross-correlation value resulting from the compensation is greatest, which is not necessarily a lattice point. The maximum cross-correlation value resulting from the compensation (for the x component of the shift only) is obtained according to:

$$k^1 = \frac{\sigma_{-x} - \sigma_{+x}}{2(\sigma_{-x} - 2\sigma_{K,L} + \sigma_{+x})} \quad \text{(Eq. 4)}$$

$$l^1 = \frac{\sigma_{-y} - \sigma_{+y}}{2(\sigma_{-y} - 2\sigma_{K,L} + \sigma_{+y})} \quad \text{(Eq. 5)}$$

Accordingly, the cross-correlation value is greatest when the two weather radar images R1, R2 are shifted by $(K+k^1, L+l^1)$. Using this information, the movement vector V describing the direction and the speed of the global movement 18 of the echo pattern forming the precipitation field 14 is obtained according to:

$$V_x = (K+k^1)\Delta x/\Delta t \text{ and} \quad \text{(Eq. 6)}$$

$$V_y = (L+l^1)\Delta y/\Delta t \quad \text{(Eq. 7)}$$

where: $V_x$ and $V_y$, respectively, indicate the x component and the y component of the movement, and $\Delta t$ is the elapsed time between consecutive measurements.

A radar image of a time after the measured time is predicted by extrapolating the echo pattern within a weather radar image measured at a certain time by employing the movement vector obtained through the equations (6), (7), above.

A forecast image J (i,j) of a time DELTA T after the measured time of the most current weather radar image I (i,j) is obtained from the calculated movement vector using the weather radar image I (i,j) as the input image and employing $V_x$ and $V_y$. The forecast image J(i,j) is defined as an image resulting from a parallel translation of the input image I (i,j) based on the amount of movement in the horizontal direction $S_x$ and the amount of movement in the vertical direction $S_y$, where:

$$S_x = \text{DELTA } T \cdot V_x \text{ and} \quad \text{(Eq. 8)}$$

$$S_y = \text{DELTA } T \cdot V_y \quad \text{(Eq. 9)}$$

However, the amount of movement is not restricted to integer values. If the non-integer shift from the lattice point of the moved image is expressed by:

$$\delta_x = S_x \lfloor S_x \rfloor \text{ and} \quad \text{(Eq. 10)}$$

$$\delta_y = S_y \lfloor S_y \rfloor, \quad \text{(Eq. 11)}$$

where: $\lfloor N_x \rfloor$ is the largest integer that does not exceed N, then the forecast image J (i,j) is defined as:

$$J(i, j) = (1 - \delta_x)(1 - \delta_y)I(i - \lfloor S_x \rfloor, j - \lfloor S_y \rfloor) + \quad \text{(Eq. 12)}$$
$$(1 - \delta_x)\delta_y I(i - \lfloor S_x \rfloor, j - \lfloor S_y \rfloor + 1) +$$
$$\delta_x(1 - \delta_y)I(i - \lfloor S_x \rfloor + 1, j - \lfloor S_y \rfloor) +$$
$$\delta_x \delta_y I(i - \lfloor S_x \rfloor + 1, j - \lfloor S_y \rfloor + 1).$$

The lattice points of the forecast image J which have no correspondence to that of the input image, that is, the blank space of the forecast image resulting from the parallel translation, are set to have the value of zero.

The forecast image is obtained in the same manner for cases other than where

Vx>0 and Vy>O.

Figure 5A:
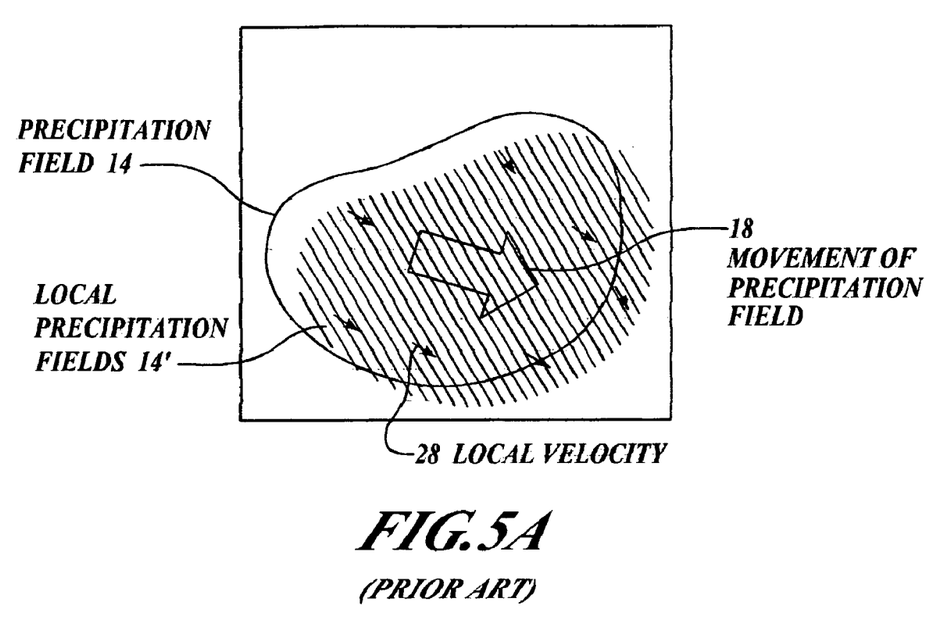
FIG. 5A describes a situation in which the global movement of the precipitation field formed by the group of echoes may be different the movement of the individual echoes.

FIG. 5A describes a situation in which the global movement 18 of the precipitation field 14 formed by the group of echoes 12 may be extremely slow when compared to the movement velocity of the individual echoes 12. This difference between the global movement 18 of the precipitation field 14 and the movement velocity of the individual echoes 12 is the result of the individual echoes 12 having differing movement velocities due to the above mentioned constant repetition of deformation and appearance and dissipation of individual echoes 12. In the case where precipitation field 14 possesses such multiple different movements, each of the different movements may define different local precipitation fields 14' through 14$^N$. Although different local precipitation fields 14' through 14$^N$ may have significantly different velocities 28, the forecast image obtained using a cross-correlation method is still reasonably accurate when the prediction lead time is short because there is a tendency for a uniform parallel translation due to the small amount of appearances, dissipations, and deformations of the echoes 12 during the short forecast interval.

Figure 5B:
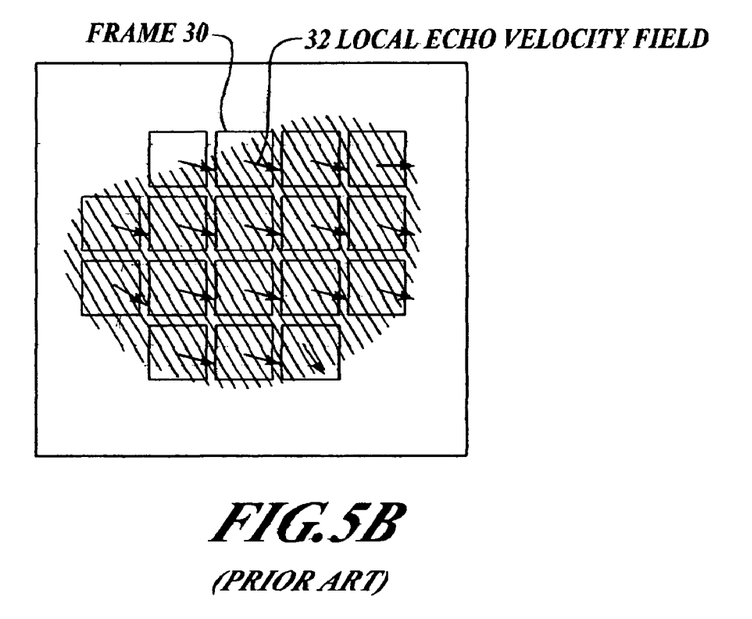
FIG. 5B illustrates the forecasting method of U.S. Pat. No. 5,974,360 for breaking the precipitation field down into smaller segments and treating each of the different smaller segments as separate precipitation fields.

However, during longer forecast intervals, each of the different local precipitation fields 14' through 14N defined by the different movements may be treated separately, thereby increasing the accuracy of the forecast. U.S. Pat. No. 5,974, 360, entitled, Method And Equipment For Weather Image Prediction, issued to Otsuka et al on Oct. 26, 1999, the complete disclosure of which is incorporated herein by reference, discloses another system and method for the real-time tracking and predicting local, short-term weather conditions using multiple weather radar images, wherein each of the different local precipitation fields 14' through 14N are treated separately. Briefly, as illustrated in FIG. 5B, the U.S. Pat. No. 5,974,360 patent discloses breaking precipitation field 14 down into multiple smaller segments 30. Velocity fields 32 of the echoes local to individual segments 30 are computed, and from within the image is extracted a single precipitation field 14' formed of multiple segments 30 possessing similar velocity fields 32 with respect to time and space. The method extrapolates multiple precipitation fields 14' through 14$^N$ over a forecast period and generates a forecast radar image J (i,j) by synthesizing the resulting image.

Flight Management Systems

Flight Management Systems (FMS) in various configurations (not shown) are known in the art as an information integration and flight control tool for commercial aircraft, as defined by the ARINC characteristic 702, the complete description of which is incorporated herein by reference. The FMS is an extension of the area navigation (RNAV) capability originally certified for aircraft in 1971. It performs the basic RNAV functions of waypoint navigation and coupled guidance as well as tuning of the aircraft's VOR/DME receivers (Variable Omnidirectional Range/Distance Measuring Equipment), the automatic selection of VORTAC (collocated VOR and DME facilities) stations, and the mixing of inertial, radio, heading and air data sensor inputs to provide optimal navigation accuracy and automatic control of engine parameters for all phases of flight. The FMS typically includes a computer with a memory module coupled thereto, a control and display unit (CDU), and a map display. The CDU provides a flight crew interface with the FMS, and the FMS informs the crew of the aforementioned flight data for any given flight condition. The pilot uses the CDU to input vertical and lateral flight control mode selections that supercede preexisting and/or default flight control modes. The vertical mode is used to control the aircraft's speed, by controlling engine thrust and aircraft attitude, and aircraft altitude between takeoff and landing.

Typically, a pilot selects the thrust rating of the engines and a desired vertical speed for the initial climb after takeoff. The pilot then typically sets thrust at the rating level of the engines and speed at a desired climb speed for the en route climb to cruise altitude. When cruise altitude is reached, speed is set based on an established criterion, such as most economical, shortest elapsed time, or another criterion consistent with maintaining the cruise altitude. During descent the pilot typically sets the engines to their idle thrust rating and selects a descent speed designed to achieve a desired descent profile. The lateral mode is used to select any one of various options, such as selection of a particular heading to change the aircraft's flight path to the selected heading. Another option allows the present heading to be maintained by a heading hold selection. Automatic navigation may also be selected to track a preprogrammed route using steering signals from an inertial or area navigation system.

Various FMS devices have been enhanced by addition of more sophisticated automatic flight control modes of operation. These include flight level change (FLCH), vertical navigation (VNAV), and lateral navigation (LNAV) flight control modes of operation. The FLCH mode automatically manages thrust and speed to climb or descend from one altitude to another. The VNAV mode provides automatic optimized profile control from initial climb through final approach, including adherence to terminal area procedure speed and altitude constraints. The LNAV mode provides automatic steering to a preprogrammed route including selected terminal automatic flight control area procedures.

One U.S. Pat. No. 5,739,770, entitled Off-Path Descent Guidance By A Flight Management System, issued to Liden on Apr. 14, 1998, the complete disclosure of which is incorporated herein by reference, discloses a method for providing off-path guidance during a descent. Another U.S. Pat. No. 4,811,230, entitled Intervention Flight Management System, issued to Graham, et al on Mar. 7, 1989, the complete disclosure of which is incorporated herein by reference, discloses an Intervention Flight Management System (IFMS) that allows a pilot to intervene in the operation of a preprogrammed flight management computer and change the speed and/or flight path of an aircraft in response to air traffic control (ATC) instructions using lateral and vertical control subroutines that override the preprogrammed instructions controlling the flight management computer, thereby reducing pilot workload when pilot attention should be focused on flight progress.

A principal objective of a FMS is to minimize the cost of flight. FMS are known in the art that utilize an adjustable cost index in providing a minimum-cost flight profile. Some known FMS achieve this objective by generating vertical and lateral profiles that minimize direct operating cost (DOC), where direct operating cost is the cost of fuel plus other costs that are proportional to flight time. Flight time costs, such as crew costs, maintenance, repair and replacement of equipment, that may be prorated with flight time, is represented in the FMS by a cost index. The FMS provides a speed command as a function of the cost index at every point in the flight profile that minimizes DOC. One FMS disclosed by U.S. Pat. No. 4,760,530, entitled, Flight Management System Providing Minimum Total Cost, issued to Liden on Jul. 26, 1988, the complete disclosure of which is incorporated herein by reference, utilizes an adjustable cost index in providing a minimum-cost flight profile.

Another objective of a FMS is to determine the speed necessary to arrive at destination at a particular ETA (estimated time of arrival) and generate a signal to control the aircraft's speed to achieve the desired ETA. U.S. Pat. No. 4,774,670, entitled Flight Management System, issued to Palmieri on Sep. 27, 1988, the complete disclosure of which is incorporated herein by reference, discloses an improvement to a FMS for accepting flight data information, including a required ETA, and generating therefrom an airspeed control signal modifying the actual airspeed of the aircraft to correspond to a required airspeed. The airspeed control signal is a function of the flight data information, including the actual airspeed, flight plan data, and wind data. The output signal is coupled to the aircraft's autothrottle to modify the output thereof to attain and to maintain the required airspeed.

Another U.S. Pat. No. 5,051,910, entitled Wind Forecast Error Compensation For 4-D Guidance In A Aircraft Flight Management System, issued to Liden on Sep. 24, 1991, the complete disclosure of which is incorporated herein by reference, discloses a FMS generating an aircraft speed control for achieving a desired arrival time. The FMS disclosed in the U.S. Pat. No. 5,051,910 patent generates a speed adjustment coefficient for calculating a wind forecast error, and generates a signal for adjusting the command speed outputted from the speed generator. The speed adjusting signal utilizes the calculated wind forecast error, actual wind speed at the current aircraft position, and wind forecast error at the aircraft position to compensate for error in the wind forecast so that the desired arrival time is achieved.

Regardless of the sophistication of the modes of operation, in all flight management systems, the pilot chooses the available modes that will best accomplish the desired vertical flight profile and lateral routing. In most instances, the pilot plans the flight in advance, both laterally and vertically, and preprograms the LNAV and VNAV modes so that the desired flight path will be followed, thereby reducing workload when pilot attention should be focused on flight progress.

Figure 6A:
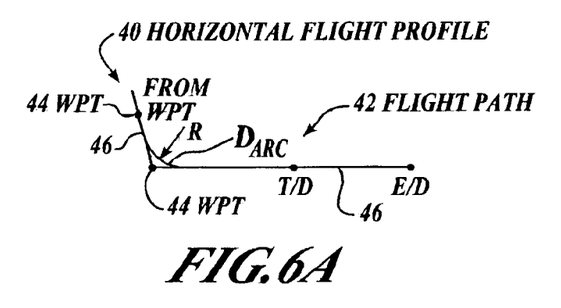
Figure 6B:
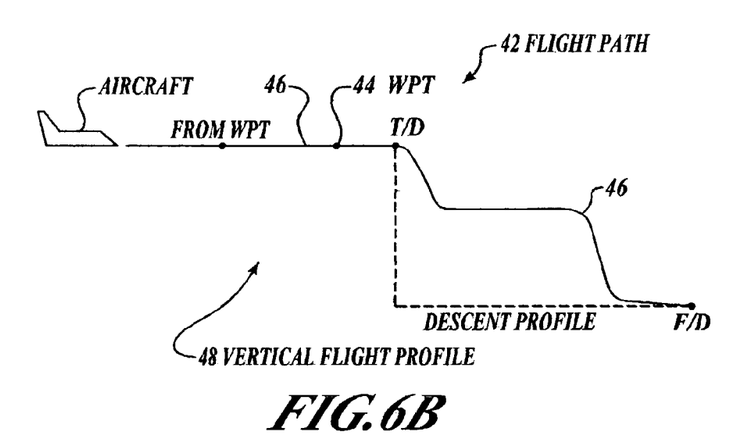
FIG. 6B illustrates the vertical component of the flight plan.

One of the many functions of a FMS is to use a simulation algorithm to construct a sequence of waypoints and connecting line segments that is referred to as a "flight plan" shown in FIGS. 6A and 6B. FIG. 6A illustrates a horizontal view 40 of the flight plan. In operation, the pilot, after takeoff, selects the route to be flown and establishes a flight plan, which the pilot then inputs into the FMS via the CDU. The FMS constructs a flight path 42 from the aircraft position to the destination, which is then used as a reference for lateral and vertical guidance. The lateral component of the path is defined by waypoints 44 and various types of line segments 46 connecting the waypoints 44. The flight plan begins at the origin runway threshold (not shown) and ends at the end of descent point E/D. 14. The FMS is coupled to the aircraft's autothrottle (not shown) and autopilot (not shown) for effecting airspeed changes.

FIG. 6B illustrates the vertical component 48 of the flight plan, which is composed of three principal phases of flight: climb, cruise and descent. As part of the performance function of a FMS, a descent path is constructed from a T/D (top of descent) point at the final cruise altitude, to a defined E/D (end of descent) point with a prescribed altitude constraint. The E/D point may, for example, be the destination runway threshold, 50 feet above the runway, or it may be some other earlier waypoint, such as the FAF (final approach fix). The E/D point is selected as part of the flight planning function of the FMS. The descent path is then constructed so that the aircraft will arrive at the E/D point using selected speed and thrust profiles in the descent phase, and so that prescribed speed and altitude constraints at various descent points are satisfied.

The FMS simulation algorithm typically develops the flight path 42 using prescribed speed and altitude constraints at selected waypoints 44, a policy speed profile, wind and temperature forecast data, track direction relative to the wind direction, aircraft gross weight at each point, guidance laws such as the turn radius in a turn, and aerodynamic characteristics of the aircraft, such as thrust, drag, fuel-flow, speed envelope, and other aircraft characteristics as required for flight simulation.

During every phase of flight, and particularly during takeoff and landing, an aircraft can encounter hazardous flight conditions caused by intense weather conditions, hereinafter referred to as "storm cells." For example, thunderstorms and rain showers often give rise to microbursts, which are intense localized downdrafts that spread along the ground, producing the dangerous phenomena known as windshear. Thus, the safety and comfort of flight would be improved if the weather data collected by an aircraft weather radar was used to project a short time into the future the position and intensity of such storm cells relative to the aircraft and a radar display was used to relate the information to the crew.

However, although radar systems are known for detecting weather conditions along the flight path of an aircraft and other methods are known for short-term prediction of weather condition movements, no method is known for using an aircraft weather radar to detect and record the position, direction and intensity of a weather condition for a limited period and to use the track and intensity information to forecast a position and intensity of the weather condition at a time in the near future. Nor is an aircraft weather radar known that operates such a weather condition position and intensity forecasting method and displays the forecast to the aircraft crew.

Furthermore, the safety and comfort of flight would be further improved if the projected future weather information was used to determine whether a coincidence with a storm cell will occur and result in a threat to the safety of flight.

Also, although FMS (Flight Management Systems) are known for determining the intended flight path of an aircraft, no method is known for combining the FMS information, such as speed, flight path, and phase of flight information, with a position and intensity weather condition forecast to determine whether an aircraft will intercept an unsafe weather condition. Nor is a method known for generating a suitable alert or warning to the aircraft crew when such an interception of an unsafe weather condition is determined.

Thus, although real-time weather tracking on a regional or global scale is known, what is needed is a weather radar system for use on aircraft that provides information on the intensity and short-term movement of weather conditions in close proximity to the host aircraft. Also desirable is a method and apparatus combining the near-term weather forecast with typical FMS information to determine when an aircraft will intercept an unsafe weather condition and provide an alert or warning to the crew when such an interception is predicted that may threaten the safety of flight.

SUMMARY OF THE INVENTION

The present invention overcomes the deficiencies of the prior art by providing a clear and unambiguous short-term forecast of the weather conditions in front of an aircraft. The present invention records information gathered by an aircraft's on-board weather radar and operates a weather incident prediction function to track the weather cell's path and intensity for a limited time and forecast where the storm will be a short time into the future. According to one aspect of the invention, a conventional weather radar is modified to include a device for storing storm cell position and intensity data and to operate a method using the recorded information to predict the future course and intensity of the storm cell relative to the host aircraft.

According to another aspect of the invention, the weather incident prediction function of the invention communicates with the on-board flight management system to access the aircraft's intended flight path stored therein and compare it to predicted future position of the storm cell. If the predicted storm cell path and the aircraft's intended flight path coincide, and if conditions, such as phase of flight and storm cell intensity, could threaten the safety of flight, an appropriate warning is issued. For example, takeoff and landing are critical phases of flight because the aircraft is in close proximity to the ground and therefore intersection with a storm cell has greater potential to lead to disaster. Therefore, intersection with a storm cell of given intensity has greater potential to lead to disaster during takeoff and landing phases of flight than intersection with a storm cell of the same intensity during a less critical phase of flight such as cruising at altitude. Preferably, the warning is issued sufficiently in advance of the predicted coincidence that ample opportunity is afforded for an appropriate course modification.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 6A and 6B illustrate a construction of waypoints connected by line segments that is referred to as a "flight plan, " FIG. 6A illustrates a horizontal view of the flight plan, while

DETAILED DESCRIPTION OF PREFERRED EMBODIMENT

In the Figures, like numerals indicate like elements.

The present invention is a method and device for predicting the future path and state, i.e., position and intensity, of a weather condition; comparing the prediction with an aircraft's flight path and other aircraft conditions; and generating a warning if a coincidence will occur and result in a threat to the safety of flight. The warning is any of a visual or aural warning, or both. Historical data and the ability to record and predict the position of a severe weather condition provide the ability to generate a warning five or more minutes before the position of coincidence is encountered. Thus affording ample opportunity for an appropriate course modification. According to one embodiment of the invention, the information describing the future position and intensity of weather conditions is an option available on request, for example, during times of severe weather conditions and/or critical phases of flight.

Figure 7:
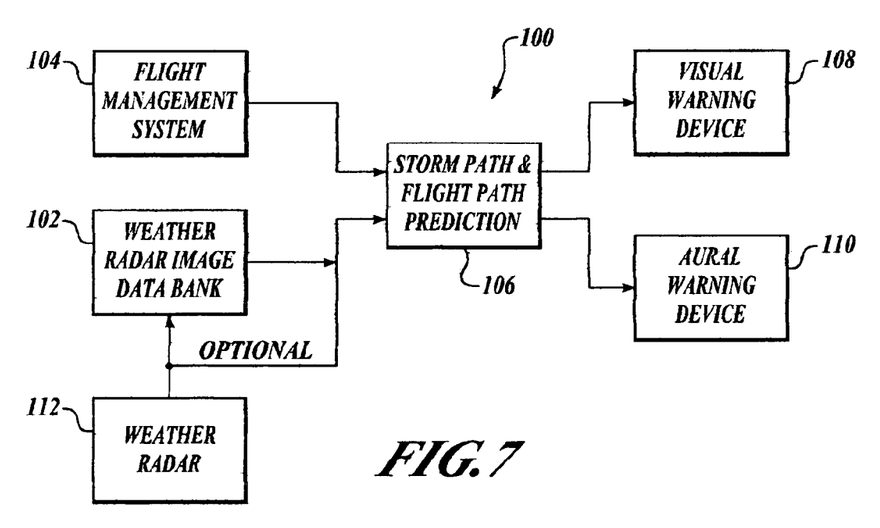
FIG. 7 illustrates the weather incident prediction method of the invention for tracking weather condition position and intensity data for a limited time and projecting future path and intensity data.

FIG. 7 illustrates the weather incident prediction method of the invention for tracking weather condition position and intensity data for a limited time and projecting future path and state data. In FIG. 7, both of a weather radar image data bank 102, and preferably a FMS 104, are coupled to a weather incident prediction function 106, which is coupled in turn to either or both of a visual warning device 108 and an aural warning device 110. A warning is generated if the forecast weather condition track and the aircraft flight path are likely to coincide, and if weather and flight conditions might threaten the safety of flight.

According to the invention, weather radar image data bank 102 is coupled to receive weather radar images generated by an on-board conventional weather radar unit 112. Weather radar image data bank 102 collects and stores sequential weather radar images separated by an arbitrary time interval DELTA T. Weather incident prediction function 106 accesses two weather radar images stored in data bank 102 and the both time interval separating them and the motion of the aircraft during that time interval. Preferably, the two images are sequential, one being a current or most recent image and the other being an image dating from an earlier time. The earlier image is preferably separated in time from the latter image by a short time period T, preferably in the range of 1 to 2 minutes or longer. The earlier image is also spatially separated from the latter image by the distance traveled by the aircraft during the same short time period T, including any heading changes occurring within time period T. The latter image is optionally a current image collected from weather radar 112, but is alternatively an image stored in data bank 102. Weather incident prediction function 106 computes the path of the detected weather condition over a short time into the future, thereby forecasting a series of future positions of the weather condition. The motion of the aircraft during the time period T between weather radar images results in the latter image being spatially separated from the earlier image. Therefore, the computations of weather incident prediction function 106 include shifting in software the earlier collected and stored image, i.e., image B in FIG. 2 as represented by oblique lines 24, to a spatial position corresponding to the position for the latter image, i.e., image A in FIG. 2 as represented by oblique lines 22. Thus, the correlation process begins by referencing the two images to the same physical location. Then, any one of the various known short-term weather prediction methods described above or another suitable short-term weather prediction method is used to forecast a series of future positions of the weather condition. Preferably, weather incident prediction function 106 forecasts the path of the detected weather condition, such as a storm cell or other precipitation field, far enough into the future that a ample opportunity is afforded for an appropriate course modification. For example, the path of a weather condition is forecast over a period of 5 to 10 minutes or more into the future, although shorter and longer times are contemplated as well. Furthermore, while the forecast period is optionally essentially the same as the time period T separating the first and second weather radar images, the future path of a weather condition is forecast over any desired future time period. Preferably, the future time period over which the path of the weather condition is forecast is variable and selectable by the operator, within a reasonable range during which the forecast data is expected to be meaningful. Preferably, the future path is predicted over a sufficiently long time period to allow the pilot to comfortably assess the situation and program in a new course. For example, at relatively high speeds the path of the weather condition is forecast over a relatively long future period. When aircraft speed is lower, the forecast is optionally projected less far into the future. During critical phases of flight, the forecast is projected as far as possible beyond the present time to allow the pilot sufficient time to respond. Weather incident prediction function 106 uses, for example, one of the above described cross-correlation methods, or another suitable real-time weather tracking and prediction method, to compute the future path of a weather condition.

Weather incident prediction function 106 preferably also determines the intensity of the detected weather condition, for example, from either or both of the earlier and latter weather radar images. According to one embodiment of the invention, weather incident prediction function 106 merely carries forward the current intensity of the weather condition into the computed future position, without forecasting any concentration or dissipation of the weather condition, i.e., improvement or worsening of the condition. According to preferred embodiments of the invention, weather incident prediction function 106 generates a forecast image and displays the forecast weather condition path and intensity information to the crew on the cockpit-mounted radar screen.

Figure 8A:
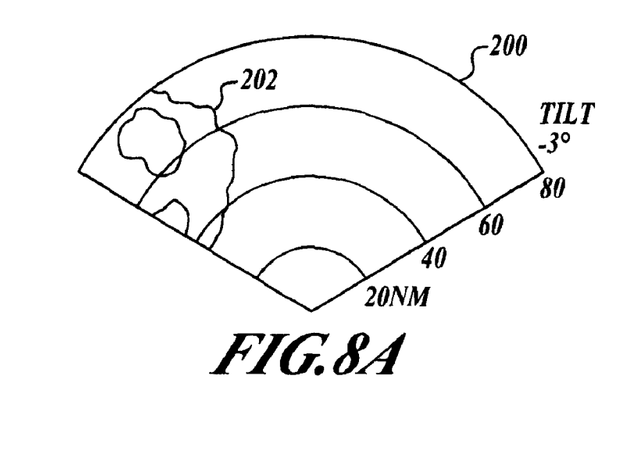
FIG. 8A illustrates a first weather radar image of a detected weather cell, for example, a storm cell or precipitation field.
Figure 8B:
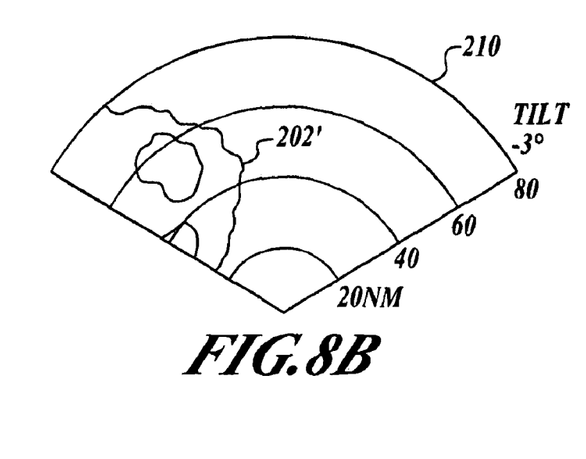
FIG. 8B illustrates a second weather radar image separated in time from the first image of the detected weather cell position showing a changed position relative to the host aircraft.

FIGS. 8A and 8B together illustrate an exemplary series of sequential conventional plan view weather radar images 200, 210, respectively, as seen from the host aircraft. FIG. 8A illustrates a first weather radar image 200, the earlier of two preferably sequential images. In FIG. 8A, the position 202 of a detected weather cell, for example, a storm cell or precipitation field, is shown off to the left of radar image 200. FIG. 8B illustrates a second weather radar image 210, the latter of the two sequential images. In the illustrative example of FIG. 8B, detected weather cell position 202 has changed to a new position 202' relative to the host aircraft. The image in FIG. 8B is either preferably a most recent weather radar image retrieved from image data bank 102 or, optionally, a relatively current image retrieved from weather radar 112. Earlier and latter images are separated in time by a known period T.

Figure 8C:
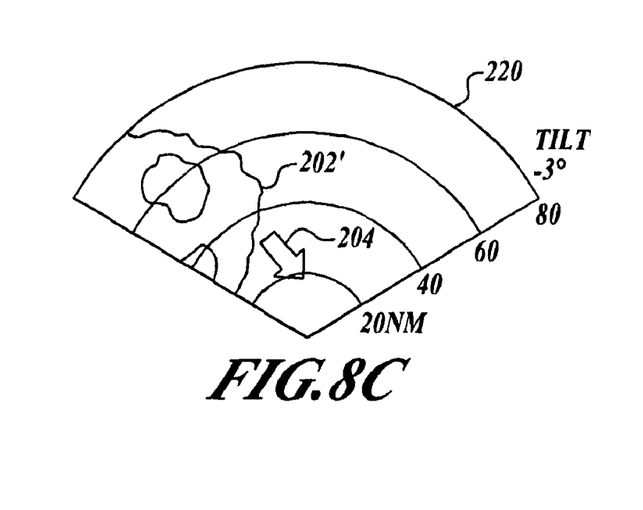
FIG. 8C illustrates an indicator describing a predicted future track of the detected weather cell as a function of the first and second time separated weather cell positions.

FIG. 8C illustrates a novel plan view weather radar image that includes the detected weather cell shown in its most recent position 202' and a clear and unambiguous indicator 204 showing the future path of the weather cell, as predicted by weather incident prediction function 106. Weather incident prediction function 106 predicts the future path of the weather cell as a function of the detected weather cell positions 202 and 202' in the two actual earlier and more current radar images and the time T separating them. The two functional weather radar images, i.e., time separated earlier and latter images 200 and 210 respectively, are both developed by the on-board weather radar so that each describes the weather condition relative to the host aircraft's position at the time the image is generated. Thus, weather incident prediction function 106 automatically factors both of the host aircraft's change of position, i.e., course and speed, into predicted future path 204 of the detected weather condition. In FIG. 8C, forecast weather radar image 220 indicates the future path of the weather cell relative to the host aircraft using, for example, a directional arrow 204. Preferably, the future path of the weather cell is predicted over a sufficiently long future time period that appropriate course modification is possible. For example, position 202" is the predicted path of the weather cell projected 5 to 10 minutes into the future.

Indicator 204 showing the future path of the weather cell must provide the weather forecast information in a clear and unambiguous format that allows the operator to quickly and easily assess the situation and respond in a timely manner. FIG. 8C illustrates one method for displaying predicted future path of the weather cell on the cockpit-mounted radar screen. Indicator 204 is optionally enhanced by providing, for example, a flashing indicator 204 displayed in a distinctive color (not shown) preferably different from colors normally used to display weather information. Thus, the invention reduces the necessity for the pilot to assess past and current weather images to forecast future weather conditions, thereby reducing pilot workload.

Figure 8D:
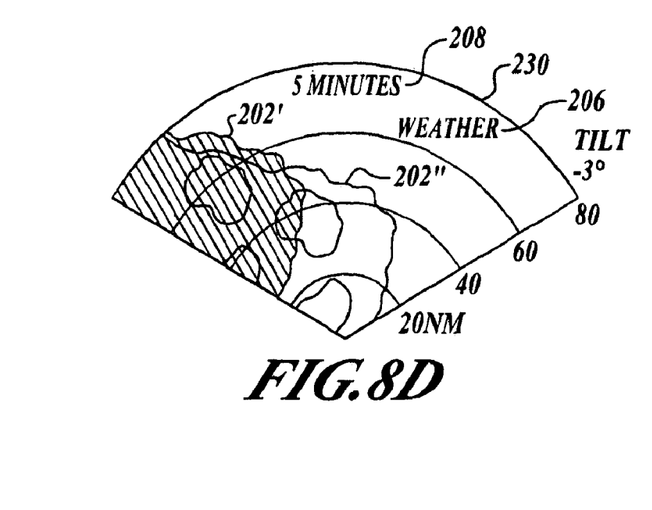
FIG. 8D illustrates one embodiment of the forecast weather information display of the invention.

FIG. 8D is a novel plan view weather radar image 230 that illustrates one optional method for displaying the forecast weather information. In weather radar image 230 shown in FIG. 8D, current or most recent detected weather cell position 202', represented by cross-hatched area, is momentarily under- or overlaid by a future forecast position 202". Optionally, overlaid forecast position 202" is displayed in a distinctive color (not shown) not usually used to display weather information. According to another optional embodiment, overlaid forecast position 202" is displayed using a faint or ghosted image (not shown), for example, formed of pixels more widely spaced than normally used to display weather information. Any of the various display embodiments of forecast position 202" is optionally combined with textual message 204 describing the time delay until the weather cell is in forecast position 202". The forecast weather cell position and intensity information is thereby displayed clearly and unambiguously on the cockpit-mounted radar screen, thus increasing pilot information while reducing pilot workload.

The intensity or severity of a weather condition is normally analyzed by the weather radar and described in the radar display using different colors to indicate different levels of intensity within the weather condition. According to additional embodiments of the invention, weather incident prediction function 106 further compares the different levels of intensity within the earlier or firstly detected weather radar image 200 with the latter or secondly detected weather radar image 210. Weather incident prediction function 106 spatially maps the earlier weather radar image 200 onto the latter image 210, analyzes the differences between the two images, and extrapolates the intensity of the weather condition after elapsed time T to forecast the intensity at a future time. In other words, weather incident prediction function 106 compares the various intensity levels within the detected weather condition between the first and second weather radar images 200 and 210, respectively, and measures increases and/or decreases in the intensity levels during the time interval T between the two images. Based on determined concentrations or dissipations occurring within the weather condition, i.e., improvement or worsening of the condition, weather incident prediction function 106 forecasts the intensity of the weather condition a short time into the future.

Preferably, weather incident prediction function 106 also accesses FMS 104 to collect either or both of aircraft intended flight path and phase of flight information. Weather incident prediction function 106 compares the intended flight path with the near-term forecast track of the weather cell, and determines whether coincidence occur. If coincidence will occur, weather incident prediction function 106 analyses the near-term forecast intensity of the weather cell, and compares the forecast intensity with the aircraft's intended phase of flight at coincidence. Weather incident prediction function 106 determines relative to predetermined criteria, such as storm cell intensity and aircraft phase of flight, whether coincidence with the weather cell is a threat to the safety of flight.

In a preferred embodiment, if weather incident prediction function 106 predicts a coincidence with the weather cell and determines that conditions at coincidence, such as storm cell intensity and aircraft phase of flight, might threaten the safety of flight, then weather incident prediction function 106 issues an appropriate warning. For example, weather incident prediction function 106 generates and transmits a visual warning signal to display device 108. Visual warning display device 108 may be any cockpit-mounted display device, but is preferably the screen of the cockpit-mounted weather radar display. According to one embodiment of the invention, the warning is the momentary overlay of forecast weather pattern image 202" (shown in FIG. 8D) flashing on the display screen. According to another embodiment, the warning is a textual message 206, such as "WEATHER" or "WEATHER AHEAD" flashing on the radar display screen (also shown in FIG. 8D). Textual message 206 preferably appears in a warning color (not shown) such as yellow or red. Optionally, weather incident prediction function 106 determines two or more gradations of threat, and the coloring of either flashing forecast weather pattern image 202" and/or textual message 206 indicates severity of the threat. For example, the visual warning is colored white for a mere "awareness" or "informational" warning where the level of threat is minimal. The visual warning is colored yellow for cautionary level of threat which is preferably avoided in the interest of comfort, but is not a threat to the safety of the aircraft, crew and passengers. A serious threat that should be avoided to preserve the safety of flight is displayed in a red color.

For example, takeoff and landing are critical phases of flight because the aircraft is in close proximity to the ground and therefore intersection with a storm cell has greater potential to lead to disaster. Therefore, intersection with a storm cell of given intensity has greater potential to lead to disaster during takeoff and landing phases of flight than intersection with a storm cell of the same intensity during a less critical phase of flight such as cruising at altitude. Therefore, according to one embodiment of the invention, the grade of threat is greater during a critical phase of flight than for a non-critical phase of flight for a predicted intersection with a storm cell of the same intensity as predicted by the weather incident prediction function 106. As a result, the aural warning annunciated on the aural warning device 110 is modified in such manner as to indicate a greater severity of threat as a function of the aircraft being in a critical phases of flight, or a lesser severity of threat as a function of the aircraft being in a less critical phase of flight. Optionally, the aural warning is modified as a function of the critical nature of the aircraft's intended phase of flight based on information stored in FMS 104, as discussed herein.

Alternatively, the visual warning displayed on the visual warning device 108, i.e., the textual message 206 (shown in FIG. 8D), is modified in such manner as to indicate a greater or lesser severity of threat as a function of the intensity of the storm cell and the aircraft's current or intended phase of flight. By example and without limitation, for a predicted intersection with a storm cell of given intensity during a critical phase of flight, the visual warning, i.e., textual message 206, may be displayed in a red color or rapidly flashing to indicate a serious threat that should be avoided to preserve the safety of flight. However, for a predicted intersection with a storm cell of the same intensity during a non-critical phase of flight, the visual warning, i.e., textual message 206, may be displayed in quiescent white colored text as a mere "awareness" or "informational" warning indicating the level of threat is minimal; or the visual warning may be displayed in yellow colored quiescent or slowly flashing text indicating a cautionary level of threat which is preferably avoided in the interest of comfort, but is not a threat to the safety of the aircraft, crew and passengers. The level of intensity of a storm cell that triggers a serious, cautionary or minimal level of threat is expected to be different for different types of aircraft because different types of aircraft may be more or less susceptible to a storm cell of the same intensity, and because different aircraft may be more or less susceptible to a storm cell of the same intensity during different critical phases of flight, such as being more susceptible during landing than takeoff or being more susceptible during takeoff than landing. Therefore, the intensity of a storm cell that triggers the visual warning, i.e., textual message 206, indicating a serious, cautionary or minimal level of threat may be different for different types of aircraft or different phases of flight. Accordingly, the intensity of the storm cell, as predicted by the weather incident prediction function 106, that triggers a triggers a warning of the different serious, cautionary or minimal grades of threat is selectable as a function of the aircraft type as well as either or both of the aircraft current or intended flight path and current or intended phase of flight information.

FIG. 8D also illustrates a textual message 208 indicating a predicted future time when the coincidence of the aircraft intended flight plan and the forecast path of the weather condition. For example, if weather incident prediction function 106 determines that the intended flight plan will carry the aircraft through the predicted future path of the weather cell, weather incident prediction function 106 also generates a message indicating approximately when the predicted coincidence will occur. In FIG. 8D, textual message 108 indicates that coincidence will occur approximately 5 minutes into the future, unless a course modification is timely made.

Optionally, an aural warning signal is generated by weather incident prediction function 106 and transmitted for annunciation by, for example, a cockpit-mounted speaker or by the pilot's headphones. The aural warning is preferably stated in clear and unambiguous terms. For example, the aural warning is "WEATHER" or "WEATHER AHEAD" and optionally includes the time or distance to the weather condition. Gradations of threat are optionally annunciated. For example, "WEATHER INFORMATION," "CAUTION, WEATHER" or "DANGER, WEATHER" are annunciated.

Other clear and unambiguous visual and aural warnings than those described are also contemplated to be within the scope of the invention.

Weather incident prediction function 106 shown in FIG. 7 is operated by a processor coupled to a data bank memory 102 for storing one weather radar images 200, and optionally, one or more additional weather radar images 210. According to one embodiment of the invention, the processor operating weather incident prediction function 106 is an independent processor coupled to each of data bank memory 102 and FMS 104, and optionally on-board weather radar 112. According to another embodiment of the invention, the processor operating weather incident prediction function 106 is the flight management computer portion of FMS 104 if sufficient processing capacity exists or is added, and data bank 102 is stored in the memory coupled to the flight management computer if sufficient capacity exists or is added.

Figure 9:
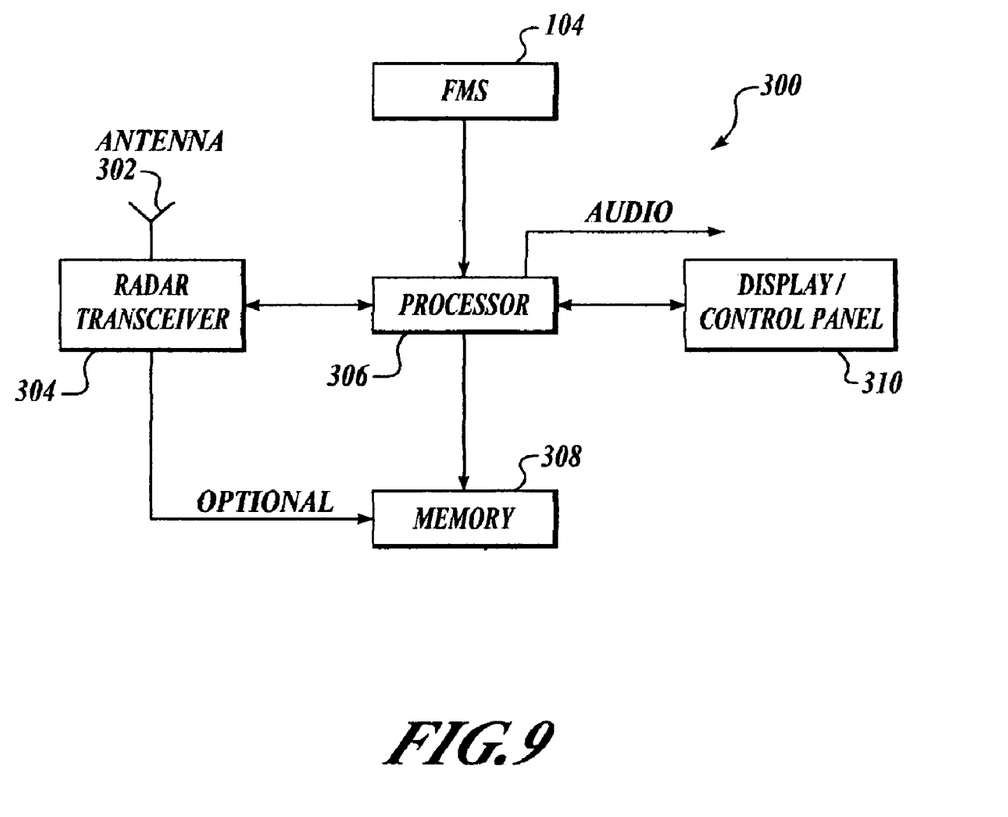
FIG. 9 illustrates an embodiment of the invention using a conventional weather radar unit modified to include sufficient memory storage capacity and processing capacity to operate the weather incident prediction function of the invention.

FIG. 9 illustrates yet another embodiment of the invention in which a conventional weather radar unit is modified to include sufficient memory storage capacity to store data bank 102 and sufficient processing capacity to operate weather incident prediction function 106. FIG. 9 illustrates a conventional weather radar system 300 modified to operate the weather incident prediction function of the invention. In FIG. 9, a radar antenna 302 transmits and receives signals in the weather band. Radar transceiver 304 couples antenna 302 and a processor 306 for transmitting and receiving weather signals. Processor 304 generates transmission signals and analyzes return signals. A memory 308 coupled to processor 306 stores weather data, preferably as weather radar images, for use in operating weather incident prediction function 106. Optionally, memory 308 is coupled to transceiver 304 to receive and store raw weather data. Processor 306 operates all common functions of a conventional radar unit processor. Processor 306 additionally receives above described earlier and latter weather data from memory 308, preferably as first and second weather radar images, and operates weather incident prediction function 106 on the data to generate a short-term weather forecast, including future track information, as described above. Processor 306 is further coupled to a conventional cockpit-mounted weather radar information display unit 310, which commonly includes weather radar function controls. Automatically, as a function of predetermined criteria, or upon receiving a command, processor 306 generates a video signal containing information describing a future weather condition as a function of aforementioned earlier and latter weather data and the time interval separating them. The video signal is transmitted to display 310 which converts the signal and displays the forecast weather information, preferably either as weather track indicator 204 (shown in FIG. 8C) or a weather radar image representative of the forecast weather information (as shown in FIG. 8D).

Preferably, processor 306 is further coupled to FMS 104 having stored therein an intended flight plan. Processor 306 preferably accesses the intended heading and phase of flight information stored in FMS 104 and operates weather incident prediction function 106 on the forecast track of one or more weather conditions or cells detected in the two earlier and later functional weather radar images and the intended flight plan. Using well-known physical laws, weather incident prediction function 106 predicts whether the aircraft's intended flight path will coincide the one or more predicted weather conditions. As a function of the coincidence prediction, weather incident prediction function 106 generates one or both of a visual alert signal and an audio alert signal. A generated visual alert signal is transmitted to display 310 where it is converted and displayed as textual message 206 (shown in FIG. 8D). The visual alert signal optionally includes a second textual message 208 (shown in FIG. 8D) indicating a predicted future time when coincidence will occur. A generated audio alert signal is transmitted to aural warning device 110, which is any conventional speaker, where it is converted into an aural warning.

Weather incident prediction function 106 also analyzes the forecast intensity of the weather condition at coincidence and the aircraft's intended phase of flight at coincidence, and based on predetermined criteria, determines whether the safety of the flight will be threatened by coincidence with the forecasted weather condition. As described above, weather incident prediction function 106 optionally modifies its visual and/or audio as a function of the predicted threat.

Optionally, either or both of the processor operating weather incident prediction function 106 and the memory storing data bank 102 are any respective processor and memory of another on-board device having sufficient capacity and coupled to accept data from FMS 104 and weather radar 112, for example, over a standard avionics data bus interconnecting the various on-board electronic equipment.

While the preferred embodiment of the invention has been illustrated and described, it will be appreciated that various changes can be made therein without departing from the spirit and scope of the invention.

What is claimed is:

1. An electronic circuit for coupling to a weather radar system on-board an aircraft to display weather information and forecast weather data relative to a phase of flight of the aircraft, comprising:

a weather radar processor adapted to receive first and second weather radar return signals from a receiver portion of said weather radar system resident on-board said aircraft and convert said first and second weather radar return signals into first and second weather radar image signals representative of weather information relative to said aircraft contained in said weather radar return signals;

a memory coupled to said processor and adapted to receive and store said first and second weather radar image signals;

a weather incident prediction function operated by said processor and coupled to said memory to receive first and second different ones of said stored weather radar image signals, said weather incident prediction function adapted to forecast future weather information relative to said aircraft as a function of said first and second stored weather radar image signals, and generate a signal representative of said future weather information; and a threat prediction function operated by said processor and coupled to receive a signal representative of a phase of flight of the aircraft and said signal representative of said future weather information, said threat prediction function adapted to compare said future weather information and said phase of flight and predict a threat to the safety of flight as a function of said comparison;

wherein said weather radar processor is further adapted to generate a warning signal as a function of said threat prediction function, and wherein said weather radar processor is further adapted to determine two or more gradations of threat and to generate said warning signal as a function of said two or more gradations of threat.

* * * * *

UNITED STATES PATENT AND TRADEMARK OFFICE
CERTIFICATE OF CORRECTION

| | | |
|---|---|---|
| PATENT NO. | : 7,664,601 B2 | Page 1 of 1 |
| APPLICATION NO. | : 10/823951 | |
| DATED | : February 16, 2010 | |
| INVENTOR(S) | : Francis W. Daly, Jr. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1379 days.

Signed and Sealed this
Fifteenth Day of March, 2011

David J. Kappos
*Director of the United States Patent and Trademark Office*